(12) United States Patent
Demia et al.

(10) Patent No.: US 7,265,843 B2
(45) Date of Patent: Sep. 4, 2007

(54) OPTICAL DETECTOR DEVICE FOR A COUNTER

(75) Inventors: Laurent Demia, Montluel (FR); Serge Bulteau, Julienas (FR); Alain Cros, Creches sur Saone (FR)

(73) Assignee: Actaris S.A.S. (FR)

( * ) Notice: Subject to any disclaimer, the term of this patent is extended or adjusted under 35 U.S.C. 154(b) by 0 days.

(21) Appl. No.: 10/536,526

(22) PCT Filed: Jan. 30, 2004

(86) PCT No.: PCT/FR2004/000224

§ 371 (c)(1),
(2), (4) Date: Nov. 16, 2005

(87) PCT Pub. No.: WO2004/079648

PCT Pub. Date: Sep. 16, 2004

(65) Prior Publication Data

US 2006/0124836 A1 Jun. 15, 2006

(30) Foreign Application Priority Data

Feb. 5, 2003 (FR) .................................. 03 01316

(51) Int. Cl.
*G01P 3/36* (2006.01)
*G06M 7/00* (2006.01)
(52) U.S. Cl. ...................... 356/445; 356/28.5; 250/221
(58) Field of Classification Search ................ 356/445, 356/138; 250/221, 231.13
See application file for complete search history.

(56) References Cited

U.S. PATENT DOCUMENTS

| 3,031,880 | A | * | 5/1962 | Findlay | .................... 374/17 |
|---|---|---|---|---|---|
| 4,327,362 | A | | 4/1982 | Hoss | ..................... 340/870.02 |
| 5,054,913 | A | * | 10/1991 | Ishikawa et al. | ........... 356/28.5 |
| 5,266,797 | A | | 11/1993 | Zuefferey | .................... 250/237 |
| 7,025,005 | B2 | * | 4/2006 | Shinozaki et al. | ............ 108/20 |
| 2002/0003206 | A1 | * | 1/2002 | Culver | ....................... 250/221 |

FOREIGN PATENT DOCUMENTS

FR 2740216 4/1997
GB 2230629 10/1990

OTHER PUBLICATIONS

International Search Report Nov. 12, 2004.

* cited by examiner

*Primary Examiner*—Gregory J. Toatley, Jr.
(74) *Attorney, Agent, or Firm*—Sofer & Haroun, LLP.

(57) ABSTRACT

An optical detector device for a counter, comprising a consumption indicator, formed from a rotating disc (4) with a section called active (4A) and optical elements of the receiver and emitter types opposite the disc. The received signal from which is used to infer the number of rotations of the disc and which comprises at least two of the optical elements (6A, 6B) of one type and at least one of the optical elements (7) of the other type. The section (4A) is a reflecting section with a center angle of 45 to 225 DEG and the two optical elements of one type (6A, 6B) are emitting elements, emitting a beam of light, where the lines connecting each trace (S(6A), S(6B)) of the beams on the disc (4) to the center of the disc form an angle at the center which is not zero.

20 Claims, 5 Drawing Sheets

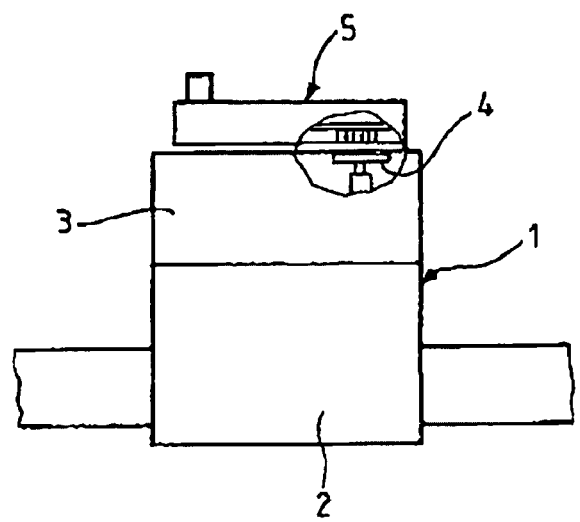
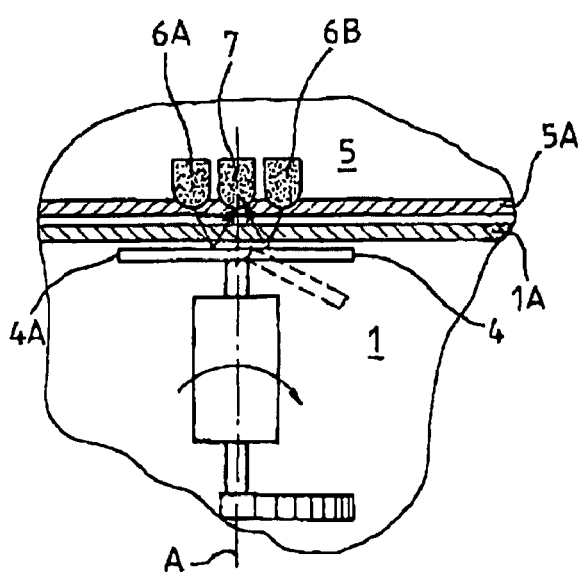
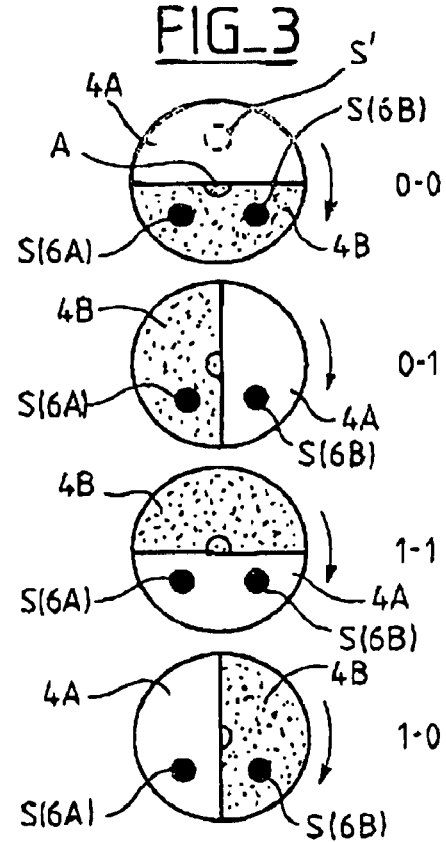

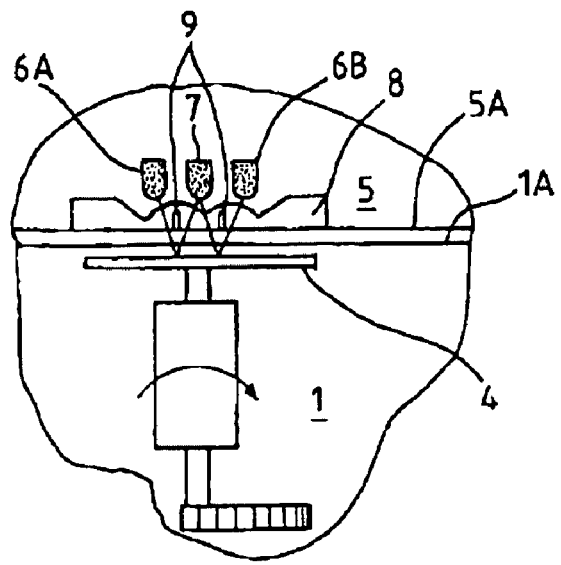
FIG_5
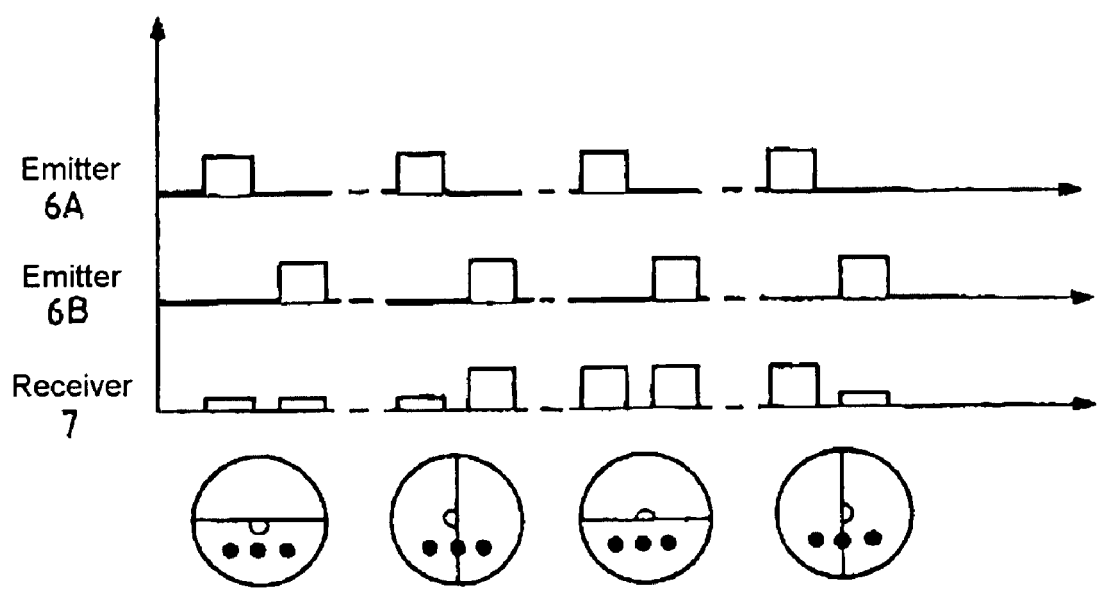
FIG_4

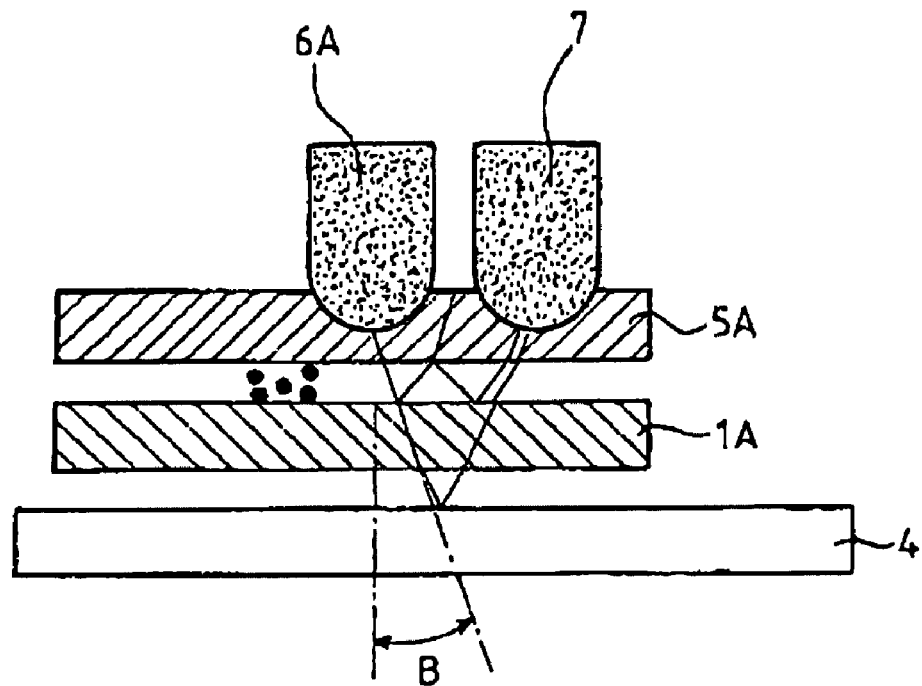
FIG_6
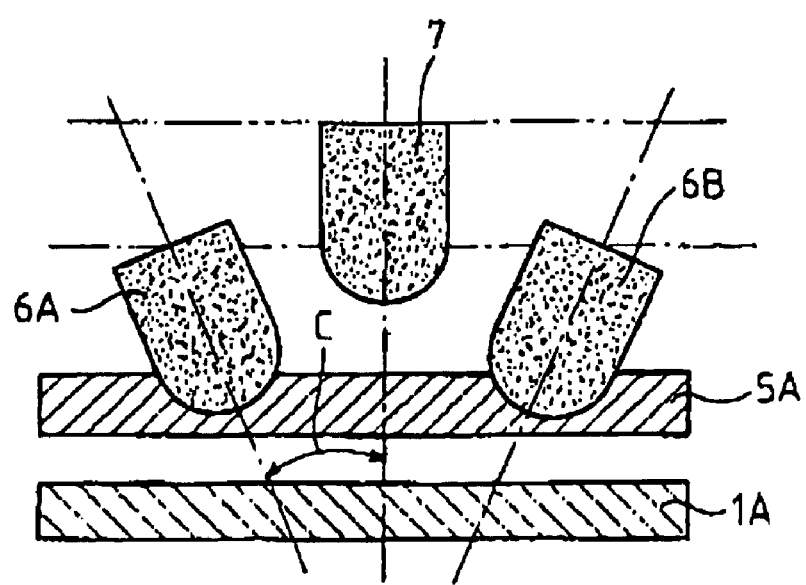
FIG_7

FIG_8
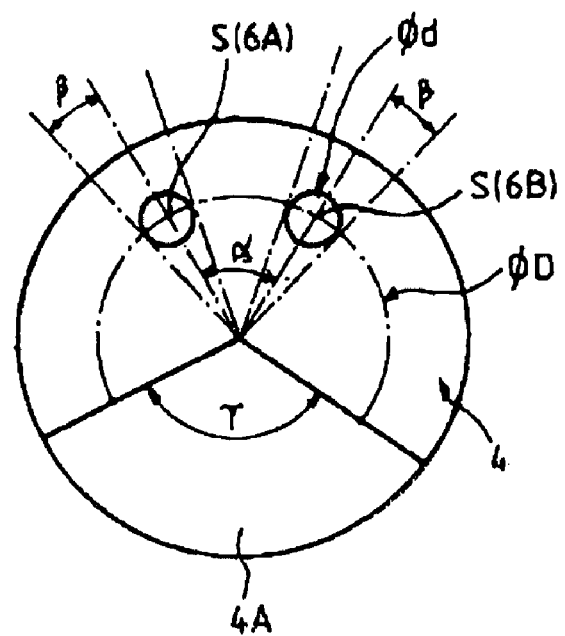
FIG_9
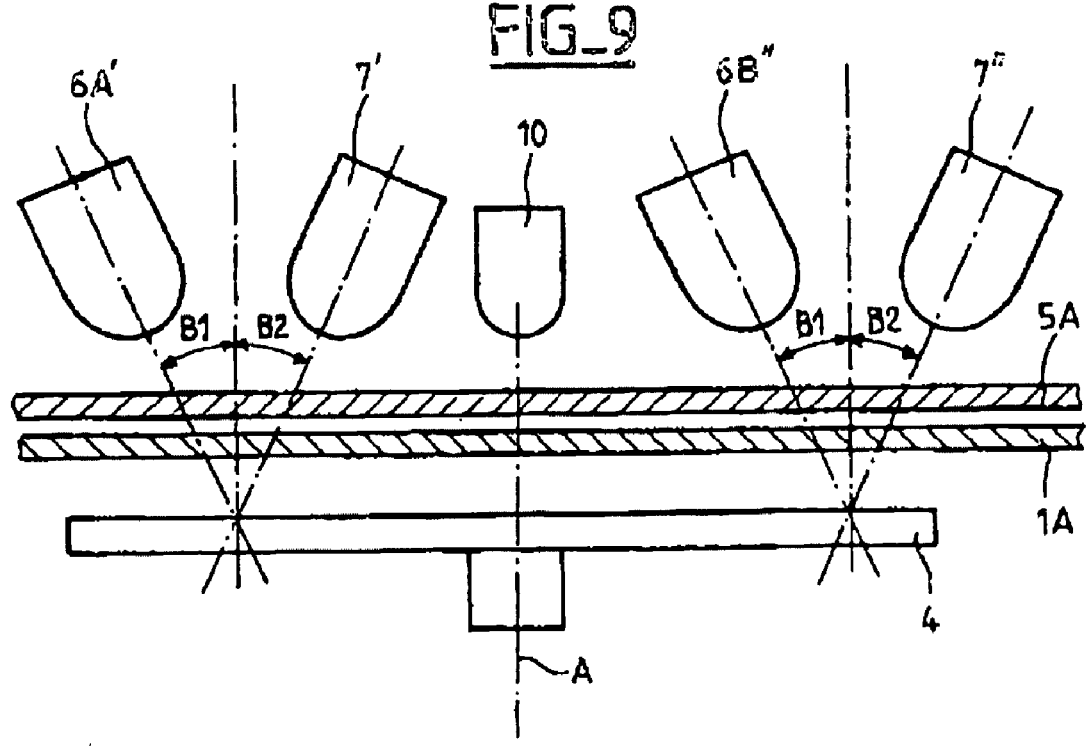

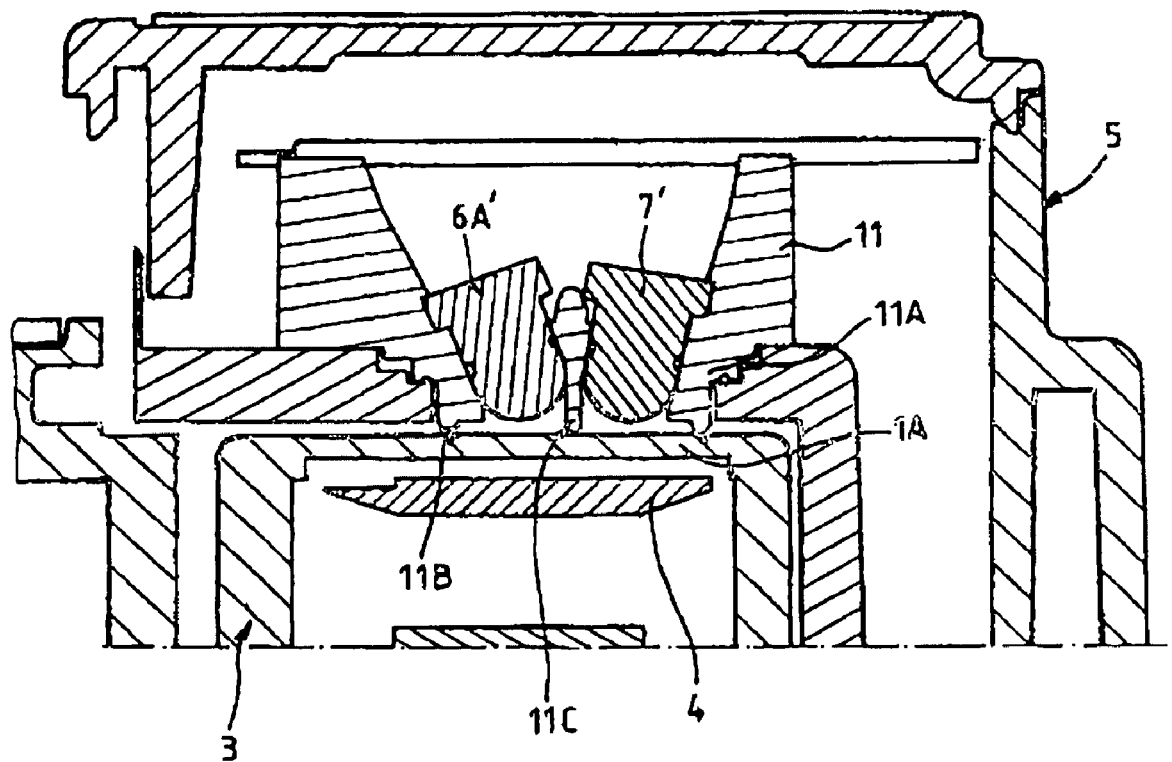
FIG_10

OPTICAL DETECTOR DEVICE FOR A COUNTER

RELATED APPLICATIONS

The present application is a national phase application of PCT/FR2004/000224, which in turn claims the benefit of priority from French Patent Application No. 03 01316, filed on Feb. 5, 2003, the entirety of which are incorporated herein by reference.

1. Field of the Invention:

The present invention pertains to an optical detector device for a meter, a fluid meter in particular e.g. water, to enable remote readout of the consumption of this water meter, or equivalent operations of logging or alert type.

2. Background of the Invention:

An optical detector device for a meter, comprising a consumption indicator formed of a rotating disc provided with a so-called active sector and optical elements of emitting and receiving type opposite the disc, whose received optical signal is processed to infer the number of rotations of the disc. Said device is known from patent EP 0 380 794.

According to this document, the device comprises an optical detector which is arranged outside the meter and which is adapted to produce an effective signal whenever an index or active sector arranged on a disc passes in front of the detector. This signal is amplified and converted into a square wave so that it can be sent onto a data transmission network. With said detection device, it is possible to determine the number of disc rotations but it is not possible to determine the direction of rotation of this disc.

Yet a fluid meter, in particular a water meter, can operate both on fluid input and on fluid output. This is the case for example when water mains are emptied during construction works, or on flow surges causing water return movement.

The consumption display device, for example an arrangement of dials with digits, takes this into consideration.

OBJECTS AND SUMMARY OF THE INVENTION

The purpose of the invention is to provide an optical detector device able to determine the direction of flow of the water and hence the direction of rotation of the indicating disc so as to take into account consumption which can be termed negative and to provide identical consumption data to the data provided by the conventional display device of the meter.

For this purpose, the invention proposes an optical detector device for a meter comprising a consumption indicator formed of a rotating disc, provided with a so-called active sector and optical elements of emitting type and receiving type opposite said disc, whose received optical signal is processed to infer the number of rotations of the disc, comprising at least two said optical elements of one type and at least one said optical element of the other type, characterized in that said sector is a reflecting sector with a centre angle called first angle lying between 45 and 225°, and said second optical elements of one type are elements emitting a light beam, the lines connecting each trace of these beams on the disc forming a centre angle in the centre of the disc called a second nonzero angle.

These optical elements may be integrated in one same component and an appropriate cover on the meter and module may limit stray light beams.

According to one preferred embodiment, the first angle is twice the value of the second angle.

The reflecting sector advantageously has a centre angle of 180° C.

The choice of a reflecting sector having a centre angle of 180° ensures optimisation of the frequency of the transmitter element or elements in relation to electric power consumption. Said meters or said modules are battery powered and it is highly advantageous that they should have low power consumption. A single light beam sequence may be chosen which is optimal irrespective of detected states. This single sequence ensures equilibrium of states in terms of angle and duration at constant speed.

Preferably the optical detector of the invention comprises two emitting optical elements and one receiving optical element.

This embodiment has the advantage of being the least costly, optical emitters generally being less expensive than optical receivers.

According to another variant, the device comprises two emitting optical elements and two receiving optical elements associated in pairs, each receiving element receiving the optical beam from the emitting element in the same pair.

Advantageously, the two optical emitters operate sequentially.

Advantageously, the three optical elements are substantially aligned and the receiving optical element lies between the emitting elements.

Preferably, the non-reflecting sector of the disc is inclined with respect to the disc axis.

The positioning of the elements may be such that that the angle of incidence of the optical beam emitted and received by the optical elements is less than 60°.

The device may comprise a collimator device for the optical beam and this collimator device may comprise slits to limit stray interference between light beams.

With this arrangement it is possible to obtain sharper state transitions and improved coupling between the optical emitters and receivers.

Advantageously, the device of the invention comprises an additional optical emitter for presence detection.

According to a first variant, the trace on the disc of this presence detection emitter is centred on the axis of symmetry of the disc.

According to a second variant, said presence detection optical emitter is associated in a pair with a receiving optical element, the trace on the disc of this emitter being substantially equidistant from those of said two preceding emitting optical elements.

With this characteristic it is possible to verify the proper positioning of the module on the meter and to detect any fraudulent or poor positioning.

The invention also concerns a fluid meter comprising a rotating disc that is part of an optical detector device such as described above.

Finally, the invention concerns a detection module intended to cooperate with a fluid meter and comprising said optical elements that are part of a device such as described above.

Advantageously, this module also comprises a collimator device for the optical beam.

According to a preferred embodiment, the emitting optical element and the receiving optical element of at least one of said pairs are housed in a common support.

Advantageously said support has a sealing lip surrounding the pair of optical elements and intended to bear upon said fluid meter.

Advantageously, said support comprises a flange separating the two optical elements and intended to bear upon said fluid meter.

BRIEF DESCRIPTION OF THE DRAWINGS

The invention is described below in more detail with the aid of figures which only show one preferred embodiment of the invention.

FIG. 1 is a view of the meter and of a module according to the invention.

FIG. 2 is a cross-section view of a detection device of the invention according to a first embodiment.

FIG. 3 is an overhead view of a rotating disc that is part of a detection device of the invention, in different positions.

FIG. 4 is a diagram illustrating processing of the data received by the detection device of the invention.

FIG. 5 is across section view of a detection device of the invention, according to a second embodiment.

FIG. 6 is a partial cross-section of a variant of embodiment of a detection device of the invention.

FIG. 7 is partial cross-section view of another variant of embodiment of a detection device of the invention.

FIG. 8 is an overhead view of a rotating disc that is part of a detection device of the invention.

FIG. 9 is a cross-section view of a detection device of the invention according to another embodiment.

FIG. 10 is a more detailed partial cross-section view of this other embodiment.

DETAILED DESCRIPTION

FIG. 1 is a front view of a fluid meter 1, more precisely a water meter, comprising a casing 2 provided with a water inlet pipe and outlet pipe surmounted by a totallizer 3 containing a transmission and shaft rotation gear mechanism for a measuring element such as a turbine or volumetric chamber contained in casing 2 which transmits to a consumption display device not shown, and a rotating indicator disc 4 parallel to an upper transparent wall of the totallizer.

An optical detection module 5 whose lower wall is at least partly transparent, is positioned on the upper wall of meter 1 in order to detect water consumption and its direction of flow.

FIG. 2 illustrates the optical detection device of the invention in more detail.

Meter 1 therefore comprises a transparent wall 1A and parallel to this wall is an indicator disc 4 driven by a transmission mechanism. This disc comprises a reflecting sector with a centre angle of between 45 and 225° and is preferably 180°.

Arranged so that they arrive opposite the disc 4 when the module is positioned on the meter 1, module 5 comprises three optical elements, more precisely two optical emitters 6A, 6B each arranged on either side of an optical receiver 7. When considering axis A of disc 4, the optical receiver 7 is offset from this axis A and the three optical elements 6A, 6B and 7 are aligned parallel to a diameter of disc 4.

Preferably, the optical emitters 6A, 6B are LED diodes emitting an infrared beam which passes through the two transparent walls 5A, 1A and is reflected on disc 4. If this beam is reflected on reflecting sector 4A, it is reflected and received by the optical receiver 7 preferably consisting of a photodiode or phototransistor. If it hits the remainder of the disc, i.e. sector 4B, only a small part of this beam is reflected and received by receiver 7. A reflected beam is considered zero if it is below a threshold value equal to this small part reflected by the non-reflecting sector of the disc.

To reduce this part reflected on the non-reflecting sector 4B of the indicator disc 4, this sector may have a pitted or scratched surface, be painted matt black or even be inclined as shown by the dotted line in FIG. 2 in order to deviate this part of the reflected beam. It is therefore possible to operate so as to minimize the reflecting power of sector 4B and maximize the reflecting power of sector 4A.

FIG. 3 shows different relative positions of disc 4 and traces on this disc of the beam S(6A), S(6B) emitted by emitters 6A, 6B, as seen along a plane perpendicular to axis A of the disc.

The direction of rotation of the disc is shown by an arrow, this direction corresponding to normal positive fluid consumption. The angle formed by the two traces of emitting elements 6A, 6B and centrally on the axis of said disc is substantially equal to 90°.

In position 3A, the two traces S(6A), S(6B) are located on the non-reflecting sector 4B of disc 4. The optical signal received by receiver 7 is below the threshold value and is considered zero, and concerns the beam emitted by each emitter 6A, 6B. A pair of values is therefore detected of (0, 0).

In position 3B, the trace S(6A) is located on the non-reflecting sector 4B of disc 4 and trace S(6B) is located on the reflecting sector 4A of disc 4. The optical signal received by receiver 7 is below the threshold value and considered zero for the beam emitted by emitter 6A. The optical signal received by receiver 7 is maximum for the beam emitted by emitter 6B. A pair of values of (0, 1) is therefore detected.

In position 3C, the two traces S(6A), S(6B) are located on the reflecting sector 4A of disc 4. The optical signal received by receiver 7 is maximum for the beam emitted by each emitter 6A, 6B. A pair of values of (1, 1) is therefore detected.

In position 3D, trace S(6A) is located on the reflecting sector 4A of disc 4, and trace S(6B) is located on the non-reflecting sector 4B of disc 4. The optical signal received by receiver 7 is maximum for the beam emitted by emitter 6A and is below the threshold value and considered zero for the beam emitted by emitter 6B. A pair of values of (1, 0) is therefore detected.

For positive consumption, the series of signals received is therefore (0, 0), (0, 1), (1, 1), (1, 0) and the frequency of their state changes makes it possible to determine the speed of rotation of the indicator disc 4 and hence consumption. A series comprising one of the preceding pairs in another order enables detection of a change in the direction of rotation of indicator disc 4 and hence a negative consumption.

It is to be noted at this point that instead of considering and using the frequency of state changes in order to determine the rate of consumption, a simpler application of the invention consists of considering and using state changes to determine consumed volume.

Instead of operating as above, it is possible to seek a small so-called minimum reflection on the so-called non-reflecting sector 4B of disc 4 instead of seeking to identify almost zero reflection. This minimum reflection corresponds to the threshold value specified above.

Therefore with the invention it is also possible to detect the positioning of the module on the meter. The signal may have three values:

zero, indicating that the module is not positioned, minimum, indicating a reflection on the non-reflecting sector 4B, maximum, indicating a reflection on the reflecting sector 4A.

These signals schematised in square waves are shown in FIG. 5. The processing of these signals does not require any complex electronics and they can be processed directly by a microcontroller.

In the above, for the purpose of simplifying the description, one light pulse was concerned that is emitted by diodes 6A, 6B over a quarter rotation of disc 4. According to the invention, optical emitters 6A, 6B operate in sequence which makes it possible to determine signals and the corresponding states and has the advantage of requiring low overall power consumption. The light beam is emitted in the form of frequency pulses related to the maximum rotation speed of the target.

In the above, optical elements 6A, 6B, 7 are advantageously SMD optical components (Surface Mounted Devices) and are simple i.e. the components have no integrated collimation.

FIG. 5 illustrates a second embodiment of the optical detector device of the invention.

According to this other embodiment, a collimation device 8 for the optical beam, of lens type, is either inserted between the transparent wall 5A of module 5 and the optical elements 6A, 6B, 7, or it is directly formed by the transparent wall 5A of module 5 configured as a collimation device 8 as shown FIG. 5.

Slits 9 are made in this collimation device 8 to limit stray interference between infrared light pulses emitted and received by the different optical elements 6A, 6B, 7.

In lieu and stead of these slits, separator walls may be used between the optical emitters and receivers.

Optical elements 6A, 6B, 7 here may also be SMD components (Surface Mounted Devices).

FIG. 6 illustrates a variant of embodiment of the invention.

Although a sealing device may be provided between the reading module and the totallizer, of gasket or press fit type for example, solid or liquid dirt or particles may deposit on the transparent wall 1A of meter 1, interfering with transmission of the light beam through the transparent walls 1A, 5A of meter 1 and of detection module 5.

To minimize this interference, optical elements 6A, 6B, 7 are arranged very close to each other so that the angle of incidence B of this beam is very small and preferably less than 60°. Therefore any power losses of the beam due to particles or dirt are minimum and the beam transmitted through the transparent walls remains of high power. Preferably, the distance between optical elements 6A, 6B, 7 is less than 2 mm.

Another solution for minimising this angle of incidence B is to choose an adequate distance between the optical elements and the disc, angle B being smaller the greater this distance.

FIG. 7 illustrates another variant of the invention.

Here the optical receiver 7 is arranged with its axis of symmetry oriented in the direction of the light beam perpendicular to the transparent wall 1A of the module, and the two optical emitters 6A, 6B have their own equivalent axis of symmetry in a plane perpendicular to this wall 1A but at an angle C with respect to this axis of symmetry of the central optical receiver 7. Preferably, this angle C is less than 60°. Also the receiver 7 is positioned above the emitting diodes 6A and 6B to avoid any direct coupling between emitter and receiver without passing through the rotating target.

FIG. 8 shows a relative position of disc 4 and of the traces of beam S(6A), S(6B) emitted by emitters 6A, 6B as seen along a plane perpendicular to axis A of the disc.

The reflecting sector 4A is a sector with a centre angle called first angle γ lying between 45 and 225°, and the lines connecting each trace S(6A), S(6B) of the beams to the centre of disc 4 form a centre angle called second nonzero angle α.

Advantageously, to obtain four states such as shown in FIG. 3 that are in equilibrium in terms of angle or duration at constant speed, the first angle γ equals twice the second angle a and, as described above, is preferably 180°.

Also, the size of traces S(6A), S(6B) of the beams is minimized so that these states are achieved in a manner that the duration of these four stable states is optimised.

In the described embodiments, the optical detector device of the invention comprises two emitting optical elements and one receiving optical element which receives the two emitted optical beams. These arrangements are particularly economical having regard to the cost of a photodiode or phototransistor.

However, while remaining within the scope of the invention, it is possible to use two emitting optical elements and two receiving optical elements, associated in pairs, each receiving element receiving the optical beam of the emitting element in the same pair.

Said detection device of the invention is shown in FIG. 9.

Two pairs each comprising an optical emitter 6A', 6B" and an optical receiver 7', 7" are arranged in the module. Each emitter 6A', 6B" emits an optical beam through the walls opposite module 5A and meter 1A, and the traces of the two beams on disc 4 are of the same type as previously described for FIG. 3.

As has already been seen, in order to minimize interference by solid or liquid dirt or particles in the transmission of the light beam through the transparent walls 1A, 5A of meter 1 and of the detection module 5, the angle of incidence B of the beams is small and preferably less than 60°. For this purpose, the optical elements 6A', 7', 6B", 7" are preferably inclined at an angle B1 and B2 with respect to the plane of symmetry of each pair, perpendicular to the walls of module 5A or meter 1A. These two angles B1 and B2 may be different and lie between 10 and 20°.

Following the same optical principle, it is possible to provide a detection device to detect the presence of the module of the meter. An optical emitter common to the detection device already described or dedicated to presence detection is arranged facing a reflecting surface, advantageously the reflecting sector 4A already described. The absence of a reflected beam indicates that the module is not positioned on the meter. Any change in this reflected beam indicates that the module is not properly positioned on the meter.

Advantageously, a dedicated additional optical emitter 10 is used for this purpose, this emitter being centred for example on disc 4. More generally, the trace of the optical beam emitted by this emitter 10 on disc 4 is centred on the axis of rotation A of disc 4.

According to another variant of embodiment of presence detection, two pairs each comprising an optical emitter 6A', 6B" and an optical receiver 7', 7" are arranged in the module as previously described and presence detection is also made by said pair comprising an optical emitter and an optical receiver. With reference to FIG. 3A, the trace S' of the corresponding presence emitter is equidistant from traces S(6A) and S(6B) of the detection emitters and advantageously at the same distance as these traces from the centre of the disc.

With said arrangement, presence is detected through the fact that at least one of the emitting and receiving pairs detects a state (1) i.e. at least one receiver receives a reflected light ray. In other words, if no receiver receives a ray, the module is not present on the totallizer.

A preferred arrangement of an emitting 6A' and receiving 7' pair is shown in cross section in FIG. 10.

This figure also shows a module 5 arranged on a totallizer 3 containing a transmission and shaft rotation gear mechanism for a measuring element such as a turbine or volumetric chamber, transmitting towards a consumption display device not shown and a rotating indicator disc 4 parallel to an upper transparent wall of the totallizer. The optical detection module 5 does not comprise a lower wall that is at least partially transparent as was the case previously. Its lower wall has an opening intended to receive a press-fit support 11 for at least one emitting and receiving pair, preferably electroluminescent diodes 6A', 7'. The first advantage of this arrangement is to eliminate the interface 5A previously considered and related stray reflections.

This support 11 comprises two housings in which diodes 6A' and 7' are inserted and which therefore radiate directly outside module 5, these housings opening onto the outside.

Also the press-fit part 11A of support 11, surrounding the two openings of these housings, has a lip 11B arranged so that it is closed, being circular for example, whose function is to bear upon wall 1A of totallizer 5 once the module has been positioned on the latter. Therefore, above the diodes, a perfectly sealed zone is obtained which, once the module is in position, avoids the intrusion of water or dirt which may deviate the light ray, as described previously with reference to FIG. 6.

The two housings for the diodes are also separated by a flange 11C whose function is also to bear upon wall 1A of totallizer 5, once the module is in position on the latter. This bearing flange 11C provides a separation between the two diodes 6A' and 7'. Therefore any stray reflection between these diodes or any direct coupling between emitter and receiver is avoided as mentioned above with reference to FIG. 7.

The invention claimed is:

1. Optical detector device for a meter, comprising a consumption indicator formed of a rotating disc provided with a so-called active sector and optical elements of emitting type and receiving type opposite one planar face of said disc, whose received optical signal is processed to infer at least the number of rotations of said disc, having at least two said optical elements of one type and at least one said optical element of the other type, wherein said sector is one reflecting sector of said planar face with a center angle called a first angle ($\gamma$) of between about 45 and 225°, and said two optical elements of one type are emitting elements of light beam, the lines connecting each trace of these beams on disc forming a center angle in the center of the disc called a nonzero second angle ($\alpha$).

2. Device as in claim 1, wherein said first angle ($\gamma$) is equal to twice said second angle ($\alpha$).

3. Device as in claim 1, wherein said reflecting sector has a center angle ($\gamma$) of 180°.

4. Device as in claim 1 further comprising two emitting optical elements and one receiving optical element.

5. Device as in claim 4, wherein said three optical members are substantially aligned and the receiving optical element is between the emitting elements.

6. Device as in claim 1, further comprising two emitting optical elements and two receiving optical elements associated in pairs, each receiving element receiving the optical beam of the emitting element in the same pair.

7. Device as in claim 1, wherein the two optical emitters operate sequentially.

8. Device as in claim 1, wherein the non-reflecting sector of said disc is inclined with respect to the axis of the disc.

9. Device as in claim 1 wherein the positioning of said optical elements is such that the angle of incidence (B) of the optical beam emitted and received by the optical elements is less than 60°.

10. Device as in claim 1 further comprising a collimator device for the optical beam.

11. Device as in claim 10, wherein said collimator device comprises slits limiting stray interference between light beams.

12. Device as in claim 1, further comprising an additional optical emitter for presence detection.

13. Device as in claim 12, wherein the trace on disc of this presence detection emitter is centered on the axis of symmetry (A) of the disc.

14. Device as in claim 6, wherein said presence detection optical emitter is associated in a pair with a receiving optical emitter, the trace (S') of this emitter on the disc being substantially equidistant from those of said two preceding emitting optical elements.

15. Fluid meter comprising:
a rotating disc that is part of an optical detector device as in claim 1.

16. Detection module intended to cooperate with a fluid meter and comprising said optical elements that are part of a device as in claim 1.

17. Module as in claim 16, further comprising an optical beam collimator device.

18. Module as in claim 6, wherein the emitting optical element and the receiving optical element of at least one of said pairs are housed in a common support.

19. Module as in claim 18, wherein said support has a sealing lip surrounding the pair of optical elements and intended to bear upon said fluid meter.

20. Module as in claim 19, wherein said support comprises a flange separating the two optical elements and intended to bear upon said fluid meter.

* * * * *